United States Patent
Dixon et al.

(10) Patent No.: US 6,767,573 B1
(45) Date of Patent: Jul. 27, 2004

(54) FRIED PET TREATS

(75) Inventors: Dan Dixon, St. Joseph, MO (US); Michael G. Rayner, St. Joseph, MO (US); Michael J. Saylock, Kansas City, MO (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/936,150

(22) PCT Filed: Mar. 8, 2000

(86) PCT No.: PCT/EP00/02177

§ 371 (c)(1),
(2), (4) Date: Sep. 7, 2001

(87) PCT Pub. No.: WO00/53031

PCT Pub. Date: Sep. 14, 2000

Related U.S. Application Data

(60) Provisional application No. 60/123,692, filed on Mar. 10, 1999.

(51) Int. Cl.[7] .............................. A23L 1/05; A23L 1/31
(52) U.S. Cl. ....................... 426/578; 426/574; 426/805; 426/656; 426/520
(58) Field of Search ................................. 426/578, 574, 426/520, 656, 805

(56) References Cited

U.S. PATENT DOCUMENTS

| | | | | |
|---|---|---|---|---|
| 4,011,345 A | * | 3/1977 | Bartsch | 426/72 |
| 4,039,692 A | * | 8/1977 | Clausen | 426/646 |
| 4,191,783 A | * | 3/1980 | Burkwall, Jr. et al. | 426/335 |
| 4,781,939 A | * | 11/1988 | Martin et al. | 426/646 |
| 5,004,624 A | * | 4/1991 | Koschak et al. | 426/623 |
| 5,132,137 A | * | 7/1992 | Reimann et al. | 426/513 |
| 5,869,121 A | | 2/1999 | Brescia et al. | 426/281 |

FOREIGN PATENT DOCUMENTS

| | | |
|---|---|---|
| DE | 37 01 861 | 8/1988 |
| GB | 2 237 497 | 5/1991 |
| JP | 59011147 | 1/1984 |
| JP | 01304864 | 12/1989 |
| WO | WO 97/02760 | 1/1997 |

\* cited by examiner

*Primary Examiner*—C. Sayala
(74) *Attorney, Agent, or Firm*—Bell, Boyd & Lloyd LLC

(57) ABSTRACT

A pet treat in a sealed container. The treat is in the form of one or more pieces of a formulated food product. Each piece has a fried body of a thermally gelled matrix containing protein and starch. Further, each piece has a moisture content of above about 25 % by weight. The pet treat may be retorted. If not retorted, it may include a preservative and preferably have a reduced pH. The non-retorted treat pieces are provided in a sealed container comprising a pouch.

27 Claims, No Drawings

US 6,767,573 B1

FRIED PET TREATS

This application claims the benefit of provisional application Ser. No. 60/123,692 filed Mar. 10, 1999.

FIELD OF THE INVENTION

This invention relates to a pet treat, preferably retorted, which simulates the appearance of meat. The invention also relates to a process of producing the pet treat.

BACKGROUND OF THE INVENTION

Pet treats differ from normal pet foods in that they are not intended to supply the pets main ration. Instead, they generally intended as a means of rewarding a pet; particularly as part of a process to modify behavior. Therefore, while pet treats may contain essential nutrients, they are usually not nutritionally balanced. They are, however, highly palatable to pets, in particular to cats and dogs.

Pet treats are available in different forms. The first category is dried pet treat which contain less than about 15% by weight moisture. Examples are baked products, such as bone shaped products for dogs. A second category is semi-moist or intermediate moisture pet treat which have moisture contents of about 20% to 50% by weight. These products are generally characterized by a soft, crumbly texture and densities comparable to meat or leathery products. These products are rendered stable by the inclusion of various acids and solutes which alter the pH and water activity to a level which prevents mold and bacterial growth. The third category covers pet chews or jerkies. These products are chewy, have low to intermediate moisture contents, are relatively dense and are shelf stable. These products are primarily intended to be chewed by the pets.

However, there is a need for additional forms of pet treats which are highly palatable. It is thus an object of the invention to provide a pet treat that is of excellent palatability and that has texture and appearance similar to that of cooked meat while being of relatively low moisture content.

SUMMARY OF THE INVENTION

In one aspect, this invention provides a pet treat comprising
  a sealed container; and
  one or more pieces of a formulated food product in the container, each piece comprising a fried body of a thermally gelled matrix containing protein and starch and having a moisture content of at least about 25% by weight.

In a preferred form of the invention, the moisture content exceeds about 30% by weight The pieces of the formulated food product have a texture and appearance similar to that of cooked meat. Further, the pieces have excellent palatability making them suitable for use as treats.

Preferably the pet treat is retorted and the sealed container is retortable.

Preferably the thermally gelled matrix is in the form of a layered, gelled matrix. The pieces preferably have a moisture content of about 30% to about 50% by weight.

The pet treat may further include a preservative.

The invention extends to a retorted pet treat comprising a retortable, sealed container, and one or more pieces of a formulated food product in the container, each piece comprising a fried body of a thermally gelled matrix containing protein and starch and having a moisture content of above about 30% by weight.

In a preferred form of the invention, the retorted pet treat has a moisture content of about 35% to 50% by weight.

The fried body of each piece may comprise layers of a thermally gelled matrix containing the protein and the starch.

In another aspect, this invention provides a process for producing a fried pet treat product, the process comprising:
  thermally gelling a protein source and a starch source for providing a thermally gelled matrix;
  forming the thermally gelled matrix into pieces;
  frying the pieces for providing fried pieces and reducing the moisture content of the pieces to no less than 25% moisture by weight;
  providing a container to receive the pieces;
  filling the pieces into the container; and
  sealing the container.

Preferably the process further comprises forming the thermally gelled matrix into a layered, gelled matrix prior to forming the matrix into pieces. This may be accomplished by using mechanical energy to heat the protein source and the starch source.

In a preferred form of the invention, the process includes introducing a preservative into the container.

The process may include the further step of reducing the pH of the pieces to the range from 4.5 to 5.2.

Preferably the frying is flash frying.

In a further preferred form of the invention, the container is a sealable pouch.

In a further aspect, this invention provides a process for producing a retorted pet treat, the process comprising:
  thermally gelling a protein source and a starch source for providing a thermally gelled matrix;
  forming the thermally gelled matrix into pieces;
  flash Finn the pieces for providing fried pieces;
  providing a retortable container,
  filling the pieces into the container; and
  retorting the container.

Preferably the process further comprises forming the thermally gelled matrix into a layered, gelled matrix prior to forming the matrix into pieces. This may be accomplished by heating the protein source and the starch source using mechanical energy in an emulsion mill and ejecting the heated mixture from the emulsion mill into a holding tube.

The pieces preferably have a moisture content of about 50% to about 65% by weight prior to frying. After frying, the fried pieces preferably have a moisture content of about 25% to about 50% by weight.

The process may further comprise filling moisture into the retortable container with the fried pieces, sufficient moisture being provided to raise the moisture content of the fried pieces to that of the pieces prior to frying, or to any other desired level.

The process may include introducing a preservative into the container.

DETAILED DESCRIPTION OF PREFERRED EMBODIMENTS OF THE INVENTION

Embodiments of the invention are now described, by way of example only.

The invention is a pet treat in the form of pieces of a formulated food product in a sealed container. Each piece comprises a fried body of a thermally gelled matrix containing protein and starch and having a moisture content of above about 25% by weight. Treats in this form are particularly suited to cats and dogs, depending respectively on the final product make-up, as set out more fully below.

Where the pieces are sealed in a retortable container, for retorting in due course, their moisture content may be above about 30% by weight, preferably from about 35% to about 50% by weight and more preferably about 40%. For non-retorted products, it is desirable to keep the moisture content relatively low, for example preferably from about 25% to 35% by weight.

The protein source and starch source used in the thermally gelled matrix may be any suitable protein and starch source. The choice of the starch and protein sources will be largely determined by nutritional needs, palatability considerations, and the type of food produced.

The protein source may be a vegetable protein source, an animal protein source, or a mixture of these protein sources. Suitable vegetable protein sources are wheat protein, soy protein, rice protein, corn protein, and the like. These proteins may be provided in the form of flours, concentrates and isolates as desired. Suitable animal protein sources are muscular or skeletal meat of mammals, poultry, and fish; meals such as meat meal, bone meal, fish meal, and poultry meal; by-products such as hearts, liver, kidneys, tongue and the like; and milk proteins.

The starch source is conveniently a grain such as corn, rice, wheat, barley, oats, or soy, and mixtures of these grains. The grain is conveniently provided in the form of a flour. Pure or substantially pure starches may also be used if desired. If flours are used, they will also provide some protein. Hence it is possible to use a material which is both a protein source and a starch source.

Various other ingredients, for example, salt, spices, seasonings, vitamins, minerals, flavoring agents, lipids, humectants, sugar and the like may also be incorporated into the thermally gellable mixture as desired. If added, the lipids may be any suitable animal fats; for example tallow, or may be vegetable fats.

The pet treat is produced by forming a thermally gelled matrix, forming the matrix into pieces, frying the pieces and filling the pieces into a container. The container is preferably retortable and is retorted. If the container is not retorted, suitable preservatives and agents to modify water activity to prevent or reduce microbial growth should be added. They may optionally be added to the retortable mixture to increase shelf life after opening of the end product by the end user.

The thermally gelled matrix may be produced in many different ways as desired.

For example, a thermally gellable mixture may be prepared from water and all the ingredients which make up the moisture-reduced, formulated food product. The thermally gellable mixture is then heated and formed into layers. This may be done as described in U.S. Pat. Nos. 4,781,939 and 5,132,137; the disclosures of which are incorporated by reference. As described in these patents, the thermally gellable mixture is fed to an emulsion mill in which the mixture is subjected to rapid mechanical heating and shearing. Any suitable emulsion mill may be used, for example the emulsion mill disclosed in U.S. Pat. No. 5,132,137. Other suitable emulsion mills are commercially available under the trade name of Trigonal and may be obtained from Siefer Machinenfabrik GmbH & Co KG, Bahnhofstrasse 114, Postfach 101008, Velbert 1, Germany.

In the emulsion mill, the temperature of the mixture is raised to the desired gelling temperature within a very short time; usually less than one or two seconds. Preferably the temperature is raised to about 100° C. to about 120° C. Alternatively, the temperature may be raised to in the range of about 45° C. to about 75° C. as described in U.S. Pat. No. 5,132,137. Usually the mechanical energy generated in the emulsion mill will be sufficient to heat the mixture to the desired temperature but this may be supplemented by the injection of superheated steam.

The heated mixture is ejected from the emulsion mill in a thin stream into a holding tube. Because the heat mixture enters the holding tube in a thin stream, it forms thin layers upon heated mixture already in the holding tube. The layered, heated mixture in the holding tube then gels while moving slowly along the holding tube. Each layer of the layered, heated mixture remains substantially, visually distinct. The residence time of the heated mixture in the holding tube is sufficient for the mixture to gel into a firm, gelled product upon reaching the exit of the holding tube. At this stage, the gelled product has the highly striated appearance and the texture of meat.

In another example, the thermally gelled matrix may be produced by emulsifying water and the ingredients which make up the moisture-reduced, formulated food product. A high speed emulsifier or homogenizer is particularly suitable for emulsification. If necessary or desired, a gelling agent may be added. The emulsion is then heated to thermally gel the emulsion to provide a thermally gelled matrix; for example in a mixer-cooker or extruder. The thermally gelled matrix may then be forced through an orifice such as an extrusion die to provide a gelled product suitable for cutting into pieces.

The gelled product obtained from the process used is then cut into pieces in a suitable cutter. The pieces are preferably of a size suitable for use in as a pet treat; for example, for dogs, of length of about 20 mm to about 35 mm. For cats, the length may be about 8 mm to about 20 mm. The pieces may be screened to remove fines.

The pieces are then flash fried. This is conveniently carried out in a deep fat frying apparatus. Any suitable deep fat frying apparatus may be used. The fat used to fry the pieces may be any suitable animal or vegetable fat or oil. Suitable vegetable oils are peanut oil, corn oil, cottonseed oil, sunflower oil, hydrogenated soybean oil and the like. Beef tallow is a suitable animal oil. The temperature of the oil is preferably in the range of about 110° C. to about 205° C.; for example about 160° C. to about 180° C.

The pieces are fried for a time sufficient to reduce their moisture content but—not to less than about 25% by weight—and to provide them with a desired color and texture. For example, the moisture content may be reduced to about 40% by weight for a retortable product. For a non-retorted, pouched product, the moisture content is preferably reduced to between 25% and 35%. Depending upon the temperature of the oil, the frying time may vary between about 5 seconds to about 2 minutes; preferably from about 10 seconds to about 1 minute. The specific time and temperature needed for any particular product will depend upon the size of the pieces but may be rapidly determined by a skilled person.

The fried pieces produced from layered pieces retain the expanded, layered structure of the unfried, layered pieces. Hence the meat-like appearance is retained.

The fried pieces may then be drained and cooled; for example to about 15° C. to about 35° C.

The fried pieces may then be filled into suitable containers using suitable filling apparatus. Where the containers chosen are retortable, these may be any suitable containers such as cans, aluminum-based trays, and the like. Non-retortable containers typically would include sealable pouches of suitable plastics materials.

Similarly, the filling machine may be any suitable filling machine. Suitable containers and filling machines are commercially available.

Preferably, in the case of retortable containers, a small amount of moisture is filled into the containers along with the fried pieces. The amount of moisture added may be such as to raise the moisture content of the pieces to the moisture content prior to frying, or to any other desired level. Flavoring agents may be included with the moisture. Suitable flavoring agents include digests of animal matter, amino acids such as glycine, fats such as tallow, and the like. Preservatives may optionally also be included, for protecting the product after initial opening of the container for end use.

The containers are then retorted under conditions sufficient to effect commercial sterilization in the normal manner. Typically, for cans, retorting is carried out at a temperature of about 115° C. to about 125° C. for about 30 to 100 minutes.

The fried pieces thus may comprise from about 25% to about 60% by weight of moisture, but preferably from about 35% to 50%. If additional ingredients such as salts, sugars, spices, seasonings, flavoring agents, minerals, and the like are included in the fried pieces, these additional ingredients preferably make up about 0.5% to about 15% by weight of the fried pieces. Carbohydrates and protein make up the remainder.

In the case where the fried treats are to be placed into pouch-type containers, rather than be retorted, suitable preservatives are added to improve shelf stability and the pH of the prepared product is reduced. The preservatives may be added at any convenient stage of the process. Preferably they are introduced to the gellable mixture prior to thermal gelling. Non-limiting examples of suitable preservatives, that may beneficially be used, include potassium sorbate and sorbic acid and others that prevent yeast and mold growth. Potassium sorbate or sorbic acid are typically used at a level of between 0.3% and 0.65% by weight, depending on the pH and water activity ($A_w$) of the product. The pH of the pouch contents is reduced to a value in the range from 4.5 to 5.2. This is preferably achieved by coating the pieces with acidulants after frying, but prior to placing them into the pouches. Non-limiting examples of suitable acidulants include phosphoric acid or other suitable organic acids. These may be used at a level of 1.8% to 2.5% by weight to reach the desired pH. The examples following further illustrate exemplary, non-limiting embodiments of the invention:

EXAMPLE 1

A base mix for producing a thermally gellable mixture is prepared from wheat gluten, de-fatted soy flour, sugars, tallow, and water. The thermally gellable mixture is run through an emulsion mill (a Trigonal Mill obtained from Siefer Machinenfabrik GmbH & Co KG). The heated mixture leaves the emulsion mill at a temperature range of from 103 to 115° C. and is discharged into a holding tube. The residence time in the holding tube is less than 6 minutes, but sufficient for a gel to form. The gelled product leaving the holding tube is cut into pieces. The pieces have a thickness of about 4 mm to about 5 mm. The length is about 10 mm for cat treats and about 25 mm for dog treats. The pieces have a striated, meat-like appearance.

The pieces are sieved to remove fines. The moisture content of the pieces is about 55% by weight The pieces are then transferred to a deep fat, batch flyer in which they are fried in beef tallow at a temperature of about 177° C. for about 20 seconds. The pieces are then removed, allowed to drain in frying baskets, and cooled to ambient temperature. The fried pieces have a moisture content of about 40% by weight and retain their striated, meat-like appearance.

The fried pieces are then transferred to a filling apparatus. In the filling apparatus, the pieces are filled into cans along with a flavor mix and about 15% by weight water. The cans are sealed in the usual manner. The cans are then retorted in the usual manner.

EXAMPLE 2

A base mixture for cat and dog treats was prepared in the same manner as described in Example 1 above. However, prior to the mix being run through the emulsion mill as per the previous example, preservatives were added.

The thermally gellable mixture so formed was run through an emulsion mill (again a Trigonal Mill obtained from Siefer Machinenfabrik GmbH & Co KG). The heated mixture was discharged from the emulsion mill at a temperature of 110° C. into a holding tube. The residence time in the holding tube was about 5 minutes. The product leaving the holding tube had gelled and was then cut into pieces of approximate dimensions as follows: thickness about 4–5 mm, length about 10 mm and height about 5 mm. The pieces presented a striated, meat-like appearance.

The pieces were sieved to remove fines. The moisture content of the pieces was determined at about 55% by weight. The pieces were then transferred to a deep fat, batch fryer and were fried in beef tallow at a temperature of about 177° C. for about 20 seconds. The pieces were removed, allowed to drain in frying baskets, and cooled to ambient temperature. The fried pieces were found to have a moisture content of about 27% by weight and retained their striated, meat-like appearance. The cooled pieces were coated with acidulants to reduce their pH to about 5. The fried pieces are then transferred to a filling apparatus. In the filling apparatus, the pieces were filled into plastic pouches along with a flavor mix and about 15% by weight water. The pouches were sealed in a conventional manner so as to retain moisture and flavour.

It will be appreciated that various changes, modifications and variations to and of the preferred embodiments described above will be apparent to those skilled in the art. These may be made without departing from the scope and spirit of the invention and without diminishing its attendant advantages. It is therefore intended that such changes, modifications and variations be covered by the appended claims.

What is claimed is:

1. A pet treat comprising
a sealed container; and
at least one piece of a formulated food product in the container, the piece comprising a fried body of a thermally gelled matrix containing protein and starch and having a moisture content of at least 25% by weight.

2. A pet treat according to claim 1 which has a moisture content of above about 30% by weight.

3. A pet treat according to claim 1 in which the fried body of each piece comprises layers of a thermally gelled matrix containing the protein and the starch.

4. A pet treat according to claim 1 including a preservative.

5. A retorted, pet treat comprising
a retortable, sealed container; and at least one piece of a formulated food product in the container, the piece comprising a fried body of a thermally gelled matrix containing protein and starch and having a moisture content of above 30% by weight.

6. A pet treat according to claim 5 which has a moisture content of about 35% to about 50% by weight.

7. A pet treat according to claim 5 in which the fried body of the piece comprises layers of a thermally gelled matrix containing the protein and the starch.

8. A pet treat comprising a sealed container and at least one piece of a formulated food product and a preservative in the container, the piece comprising a fried body of a thermally gelled matrix containing protein and starch and having a moisture content of at least 25% by weight.

9. A pet treat according to claim 8 which has a moisture content in the range from 25% to 35% by weight.

10. A pet treat according to claim 8 in which the fried body of the piece comprises layers of a thermally gelled matrix containing the protein and the starch.

11. A pet treat according to claim 8 wherein the piece has a pH in the range from 4.5 to 5.2.

12. A process for producing a fried pet treat product, the process comprising:

thermally gelling a protein source and starch source for providing a thermally gelled matrix;

forming the thermally gelled matrix into pieces;

frying the pieces for providing fried pieces and reducing the moisture content of the pieces to no less than 25% moisture by weight;

filling the pieces into a container; and sealing the container.

13. A process according to claim 12 comprising forming the thermally gelled matrix into a layered, gelled matrix prior to forming the matrix into pieces.

14. A process according to claim 12 including the step of introducing a preservative into the container.

15. A process according to claim 12 including reducing the pH of the pieces to the range from 4.5 to 5.2.

16. A process according to claim 12 wherein the step of frying is by using a flash frying process.

17. A process according to claim 12 wherein the container is a sealable pouch.

18. A process for producing a retorted pet treat, the process comprising:

thermally gelling a protein source and a starch source for providing a thermally gelled matrix;

forming the thermally gelled matrix into pieces;

flash frying the pieces for providing fried pieces; and filling the pieces into a retortable container and retorting the container.

19. A process according to claim 18 further comprising forming the thermally gelled matrix into a layered, gelled matrix prior to forming the matrix into pieces.

20. A process according to claim 18 in which the thermally gelled matrix is formed into the layered, gelled matrix by heating the protein source and the starch source using mechanical energy in an emulsion mill and ejecting the heated mixture from the emulsion mill into a holding tube.

21. A process according to claim 18 in which the pieces have a moisture content of about 50% to about 65% by weight prior to frying.

22. A process according to any claim 18 in which the fried pieces have a moisture content of about 35% to about 50% by weight.

23. A process according to claim 18 further comprising filling moisture into the retortable container with the fried pieces, sufficient moisture being provided to raise the moisture content of the fried pieces to that of the pieces prior to frying.

24. A retorted pet treat comprising a retortable, sealed container and at least one piece of a formulated food product in the container, the piece having a moisture content of no less than 25% by weight and comprising a fried body of a thermally gelled matrix, the pet treat being produced by a process comprising:

thermally gelling a protein source and a starch source for providing a thermally gelled matrix;

forming the thermally gelled matrix into pieces;

flash frying the pieces for providing fried pieces; and filling the pieces into a retortable container and retorting the container.

25. A pet treat according to claim 24 which has a moisture content of at least about 25% by weight.

26. A pet treat according to claim 25 which has a moisture content of about 35% to about 50% by weight.

27. A pet treat according to claim 24 in which the fried body of the piece comprises layers of a thermally gelled matrix containing the protein and the starch.

* * * * *